United States Patent [19]

Sato et al.

[11] 4,386,688

[45] Jun. 7, 1983

[54] VEHICLE SPEED RESPONSIVE BRAKE AND DECELERATOR CONTROLS

[75] Inventors: Yoshito Sato; Tokuhiro Yato, both of Hirakata, Japan

[73] Assignee: Kabushiki Kaisha Komatsu Seisakusho, Tokyo, Japan

[21] Appl. No.: 196,663

[22] Filed: Oct. 14, 1980

[30] Foreign Application Priority Data

Oct. 11, 1980 [JP]   Japan ................................. 54/129982

[51] Int. Cl.$^3$ ............................................. B60K 41/28
[52] U.S. Cl. ............................... 192/0.033; 192/0.044; 192/3.58; 192/103 R; 74/866
[58] Field of Search ................. 192/0.033, 3 TR, 3 G, 192/3 M, 3.58, 3.62, 0.09, 103 R, 0.044; 74/859, 866

[56] References Cited

U.S. PATENT DOCUMENTS 4,263,997   4/1981   Poore ............................. 192/0.033
4,267,914   5/1981   Saar ................................ 192/0.033

FOREIGN PATENT DOCUMENTS 2544454   4/1977   Fed. Rep. of Germany ..... 192/3 G

*Primary Examiner*—George H. Krizmanich
*Attorney, Agent, or Firm*—Armstrong, Nikaido, Marmelstein & Kubovcik

[57] ABSTRACT

An automatic decelerator device for use in crawler-type vehicles such as a bulldozer or the like comprising a vehicle speed change lever means having a plurality of speed stages for forward and backward drives, a plurality of solenoid operated valves provided in a transmission for controlling the same to change over the vehicle speed and/or the drive direction, controller means adapted to actuate brake means and a decelerator, a comparator for comparing an actual vehicle speed with a preset vehicle speed so as to detect whether the actual vehicle speed is higher or lower than the preset one thereby generating a signal corresponding to the detection result, and a solenoid operated valve control circuit for controlling the controller means and the solenoid operated valves in response to the signal.

5 Claims, 2 Drawing Figures

FIG.2

| SOLENOID OPERATED VALVES / SPEED STAGES | 111 | 112 | 113 | 114 | 115 |
|---|---|---|---|---|---|
| $F_1$ | O | | | O | |
| $F_2$ | | O | | O | |
| $F_3$ | | | O | O | |
| $R_1$ | O | | | | O |
| $R_2$ | | O | | | O |
| $R_3$ | | | O | | O |
| N | | | | | |

VEHICLE SPEED RESPONSIVE BRAKE AND DECELERATOR CONTROLS

BACKGROUND OF THE INVENTION

1. Field of the Invention

This invention relates to an automatic decelerator device, and more particularly to an automatic decelerator device used conveniently for driving a track-type vehicle such as a bulldozer or the like.

2. Description of the Prior Art

In the conventional track-type vehicles, it has been a common practice for the operator to depress the brake pedal and the decelerator pedal for adjusting the engine so as to slow down the vehicle, and then change the forward drive into the backward drive and vice versa.

If such an operation as depressing the brake pedal and the decelerator pedal can be eliminated, operator's labors required for the operation of the bulldozer can be remarkably reduced and therefore it will become possible for him to concentrate on other works on the bulldozer.

SUMMARY OF THE INVENTION

The present invention has been contemplated in view of the above-mentioned circumstances and has for its object to provide an automatic decelerator device for use in a track-type vehicle such as a bulldozer or the like wherein the brake and the decelerator can be rendered operative automatically without depressing the brake pedal and the decelerator pedal, and the forward drive of the vehicle can be smoothly switched over to the backward drive and vice versa without imparting any shock to the vehicle body, and further when a vehicle speed is preset and the actual vehicle speed is higher than the preset one, the brake and the decelerator will be rendered operative automatically, and then the transmission gear will be changed over to its relevant position, whilst when the actual vehicle speed is lower than the preset one, the brake and the decelerator will be rendered in operative and change-over of the transmission gear will be made immediately, and further the automatic operation of the device can be switched over to the manual one and vice versa.

BRIEF DESCRIPTION OF THE DRAWINGS

Other objects, features and advantages of the present invention will become apparent from the following description and the claim as illustrated in the accompanying drawings in which:

FIG. 2 is a table showing combinations of five solenoid operated valves each actuating a speed change gear at respective speed stage positions of a gear shifting lever.

DETAILED DESCRIPTION OF THE PREFERRED EMBODIMENT

Figure 1:
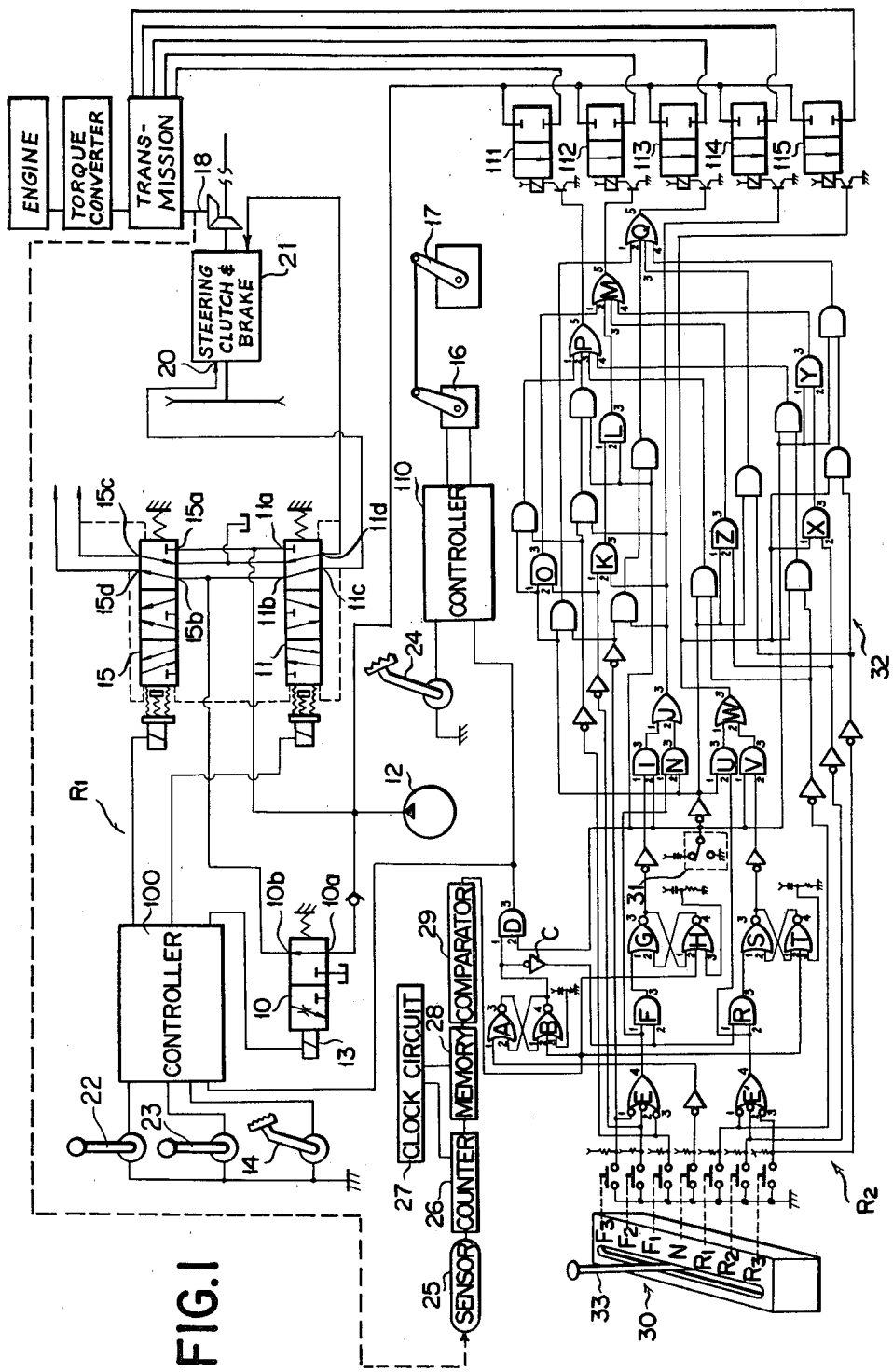
FIG. 1 is a diagrammatic view of one embodiment of the present invention.

The present invention will now be described by way of example only with reference to the accompanying drawings.

In FIG. 1, reference character $R_1$ denotes a steering-brake control circuit and $R_2$ a speed change control circuit.

The steering-brake control circuit $R_1$ comprises a brake valve 10 and left and right side steering control valves 11 and 15. The brake valve 10 has an inlet port 10a connected with the delivery side of a pump 12. A servo-motor 13 mounted on the spool of the brake valve 10 is electrically connected through a controller 100 with a brake pedal 14 and an output side 3 of AND gate D disposed in the speed change control circuit $R_2$.

The delivery side of the pump 12 is connected with pump ports 11a and 15a of the steering control valves 11 and 15, respectively. The brake valve 10 has an outlet port 10b which is connected with ports 11b and 15b of the steering control valves 11 and 15, respectively.

The left side steering control valve 11 has a clutch port 11c which is connected with a left side clutch actuating port 20, and a brake port 11d which is connected with a left side brake actuating port 21.

A decelerator pedal 24 is electrically connected through a controller 110 with a servo-motor 16 for operating an engine throttle lever 17. Further, the servo-motor 16 is electrically connected through the controller 110 with the output side 3 of AND gate D. The engine throttle lever 17 is connected with the servo-motor 16.

The aforementioned speed change control circuit $R_2$ comprises a revolution sensor 25 mounted on the side of the output shaft 18 of the transmission, a counter circuit 26, a clock circuit 27, a memory circuit 28, a comparator circuit 29, a speed change lever means 30, solenoid operated valves 111 to 115 respectively used for first, second and third speeds, forward and backward drives in cooperation with the transmission, an automatic and manual operation change-over switch 31, and a solenoid operated valve control circuit 32. Reference numerals 22 and 23 denote steeling levers; respectively.

The operation of the automatic decelerator device of the present invention will now be described below.

A power supply switch is switched on, and the automatic and manual operation change-over switch 31 is at its automatic position.

A preset vehicle speed of about 1.0 km/hr. is supplied as an input into the comparator 29.

The arrangement is made such that if the actual vehicle speed detected by the revolution sensor 25 is lower than the preset one, then the output of the comparator 29 will assume high level H, whilst if the detected vehicle speed is higher than the preset one, then the output of the comparator 29 will assume low level L.

(A-1) When the gear shifting lever 33 is set at its neutral position N;

a. Since the actual vehicle speed detected by the revolution sensor 25 is zero and an input 2 of 3-input NOR gate B is set at its high level H, an output 3 of 2-input AND gate D will assume low level L so that the controllers 100 and 110 are rendered inoperative and so the brake and the decelerator cannot be actuated.

b. Because an input 1 of 2-input AND gate F is at its low level L, an input 1 of 2-input NOR gate G will assume low level L, and since the input 2 of the NOR gate G is set at low level L, the output 3 thereof will assume high level H. Therefore, since the input 1 of 2-input OR gate J is set at low level L, and the input 2 of 2-input AND gate N is set at low level L, the input 2 of OR gate J will be set at low level L with the output 3 thereof assuming low level L so that the forward drive solenoid operated valve 114 is rendered off.

Further, in the similar manner, the backward drive solenoid operated valve 115 is rendered off or inoperative.

Because the input 1 of 2-input AND gate K assumes low level L, the output 3 thereof will assume low level L. Therefore, the output 3 of 2-input AND gate L is also set at low level L, and so the input 2 of 4-input OR gate M will assume low level L.

Further, since the input 1 of 2-input AND gate O assumes low level L, the output 3 thereof will assume low level L, and so the input 1 of 4-input OR gate M will also assume low level L.

Since inputs 3, 4 of OR gate M also assume low level L, the output 5 thereof will assume low level L so that the second speed solenoid operated valve 112 is rendered off.

In the similar manner as mentioned above, both the output 5 of 4-input OR gate P and the output 5 of 4-input OR gate Q will assume low level L so that the first and third speed solenoid operated valves 111 and 113 will be turned off, resulting in the transmission gear being kept at its neutral position N without causing any change-over.

(A-2) When the gear shifting lever 33 is moved from its neutral position N to its forward second speed position $F_2$;

a. Because the actual vehicle speed is zero before start, the brake and the decelerator will not be actuated in the same manner as in the aforementioned case.

b. Since the input 2 of 3-input NAND gate E assumes low level L, the output 4 of NAND gate E will assume high level H, whilst since inputs 1, 2 of 2-input AND gate F assume high level H, the output 3 thereof will assume high level H. Accordingly, the output 3 of 2-input NOR gate G will assume low level L, and the input 1 of 2-input AND gate I will assume high level H. Further, since the input 2 of gate I assumes high level H, the output thereof will assume high level H and the output 3 of 2-input OR gate J will assume high level H so that the forward drive solenoid operated valve 114 is rendered operative.

Because inputs 1, 2 of 2-input AND gate K assume high level H, the output 3 thereof will assume high level H.

Accordingly, the input 1 and another input of 2-input AND gate L assume high level H so that the output 3 thereof will assume high level H and the output 5 of 4-input OR gate M will assume high level H thereby turning the second speed solenoid operated valve 112 on.

Further, since the first and third speed solenoid operated valves 111 and 113 and the backward drive solenoid operated valve 115 are turned off, the transmission gear will be changed over to the forward second speed position.

c. Even if, during working at the forward second speed, the actual vehicle speed has increased beyond the preset one, the brake and the decelerator will not be automatically actuated without causing any change-over of the transmission gear. This is because when the gear shifting lever 33 occupies its neutral position N the actual vehicle speed is zero and therefore the output 4 of 3-input NOR gate B is set at low level L, and so the input 2 of 2-input NOR gate will assume low level L, whilst its another input 1 will assume high level H.

In the next place, when the gear shifting lever 33 is moved to its forward second speed position, the input 1 of 2-input NOR gate A will assume low level L and the input 1 of 3-input NOR gate B will be set at its high level H, and regardless of whether the input 2 of 3-input NOR gate B assumes high level H or low level L when comparing the actual vehicle speed with the preset one, the output 4 of 3-input NOR gate B will be set at low level L.

Therefore, the controllers 100 and 110 will not be actuated and so the brake and the decelerator will be rendered inoperative.

(A-3) When the gear shifting lever 33 is moved from its forward second speed position $F_2$ through the neutral position N to its backward second speed position $R_2$;

(A-3-1) In case the actual vehicle speed is lower than the preset one: In the same manner as in the case of the item (A-2), the brake and the decelerator are rendered inoperative, and because of the input 2 of 3-input NAND gate E' assuming low level L, the output 4 thereof will assume high level H. Further, since both inputs 1, 2 of 2-input AND gate R assume high level H, the output 3 of the AND gate R will assume high level H. Therefore, the output 3 of 2-input NOR gate S will assume low level L, and so the input 2 of 2-input AND gate V will assume high level H. Further, because the input 2 of the AND gate V is set at high level H, the output thereof will assume high level H, and so the output 3 of 2-input OR gate W will assume high level H so that the forward drive solenoid operated valve 114 is rendered operative.

Since inputs 1, 2 of 2-input AND gate X assume high level H, the output 3 thereof will assume high level H.

Consequently, the input 2 of 2-input AND gate Y will assume high level H, whilst another input 1 thereof will also assume high level H so that the output 3 thereof will assume high level H, and so the output 5 of 4-input OR gate M will assume high level H thereby rendering the second speed solenoid operated valve 112 operative.

Further, since the first and third speed solenoid operated valves 111 and 113 and the forward drive solenoid operated valve 114 are all turned off, the transmission gear will be changed over to its backward second speed position.

(A-3-2) In case the actual vehicle speed is higher than the preset one;

a. Because all inputs 1, 2, 3 of 3-input NOR gate B assume low level L, the output thereof will assume high level H, and because both inputs 1, 2 of 2-input AND gate D assume high level H, the output 3 thereof will assume high level H. As a result, the controllers 100 and 110 will be rendered operative so that the brake and the decelerator can be actuated.

When the actual vehicle speed has become less than the preset one, the input 1 of 2-input AND gate D will assume low level L and so the output 3 thereof will assume low level L thereby rendering the brake and the decelerator inoperative.

b. Since the input 1 of 2-input AND gate R assumes low level L, the input 2 of 2-input NOR gate S will assume low level L and the output 3 thereof will assume high level H, and because both inputs 1, 2 of 2-input OR gate W assume low level L, the output 3 of the OR gate W will assume low level L. As a result, the backward drive solenoid operated valve 115 is rendered off.

Further, since the input 1 of 2-input AND gate X assumes low level L, the input 2 of 2-input AND gate Y will assume low level L, and so the input 4 of 4-input OR gate M will assume low level L. In the same manner as in the case of the item (A-1)-b., inputs 1, 2, 3 of 4-input OR gate M assume low level L, and so the output 5 thereof will assume low level L. Therefore, the second speed solenoid operated valve 112 is turned inoperative. In the same manner as in the case of the item (A-1)-b., the first and third speed solenoid operated valves 111 and 113 and the forward drive solenoid operated valve 114 are all rendered off or inoperative with the transmission gear being held at the neutral position N thereof.

c. When the brake and the decelerator are automatically actuated so as to reduce the actual vehicle speed below the preset one, only the second speed solenoid operated valve 112 and the backward drive solenoid operated valve 115 are rendered operative, and so the transmission gear will be changed over to the backward second speed position thereof as in the case of the item (A-3-1).

The foregoing description has been made in respect of the automatic operation of the device, and the manual operation thereof will be described hereafter.

When the power supply switch is turned on and the automatic and manual operation changeover switch 31 is set at its manual operating position;

(M-1) When the gear shifting lever 33 is set at its neutral position N, the output 5 of 4-input OR gate P, the output 5 of 4-output OR gate M, the output 5 of 4-input OR gate Q, the output 3 of 2-input OR gate J, and the output 3 of 2-input OR gate W all assume low level L, and therefore the transmission gear is kept at its neutral position N.

(M-2) When the gear shifting lever 33 is moved from its neutral position N to the forward second speed position $F_2$ thereof;

Since inputs 1, 2 of 2-input AND gate O assume high level H, the input 1 of 4-input OR gate M will assume high level H and so the output 5 thereof will assume high level H so that the second speed solenoid operated valve 112 is turned on. At the same time, inputs 1, 2 of 2-input AND gate N assume high level H and so the output 3 of 2-input OR gate J assumes high level H so that the forward drive solenoid operated valve 114 is rendered operative. As a result, the transmission gear will be changed over to the forward second speed position thereof.

(M-3) When the gear shifting lever 33 is moved from its forward second speed position $F_2$ through its neutral position N to its backward second speed position $R_2$:

In the same manner as in the case of the automatic operation described in the item (A-3-1) after the transmission gear has passed through the neutral position N, inputs 1, 2 of 2-input AND gate Z will assume high level H, and so the input 3 of 4-input OR gate M will assume high level H so that the output 5 thereof will assume high level H thereby rendering the second speed solenoid operated valve 112 operative.

At the same time, inputs 1, 2 of 2-input AND gate U will assume high level H and so the output 3 of 2-input OR gate W will assume high level H so that the backward drive solenoid operated valve 115 will be rendered operative.

As a result, the transmission gear will be changed over to the backward second speed position thereof.

FIG. 2 is a table showing combinations of the five solenoid operated valves 111 to 115 inclusive at each speed stage for the forward and the backward drives when the gear shifting lever 33 is moved to any of the positions $F_1$, $F_2$, $F_3$, $R_1$, $R_2$, $R_3$ and N. It is to be noted that the solenoid operated valves marked with O in FIG. 2 are rendered operative at each of six speed stages.

As described in detail hereinabove, the present invention is characterized by comprising a speed change lever means 30 having a plurality of speed stages for forward and backward drives, respectively, and including a gear shifting lever 33 for changing over the vehicle speed, first second and third speed solenoid operated valves 111, 112 and 113 and forward and backward drive solenoid operated valves 114 and 115 all of which are mounted in the transmission gear so as to change over the vehicle speed for forward and backward drives, respectively, a controller 100 and a servo-motor 13 adapted to actuate the brake of a brake gear, a controller 110 and a servo-motor 16 adapted to actuate a decelerator, a comparator 29 adapted to compare the actual vehicle speed detected by means of a revolution sensor with a preset vehicle speed so as to detect whether the vehicle speed thus detected is higher or lower than the preset one and then transmit a signal corresponding to the result of detection, a solenoid operated valve control circuit 32 arranged to control said controllers 100 and 110 and change over the first, second and third speed solenoid operated valves 111, 112 and 113 and the forward and backward drive solenoid operated valves 114 and 115 so as to render the brake and the decelerator operative automatically and enable the change-over of the vehicle speed to be made when the detected vehicle speed is higher than the preset one, said solenoid operated valve control circuit 32 being further adapted to control said controllers 100 and 110 and change over the first, second and third speed solenoid operated valves 111, 112 and 113 and the forward and backward drive solenoid operated valves 114 and 115 so as to render the brake and the decelerator inoperative, and enable the change-over of the vehicle speed to be made immediately when the detected vehicle speed is lower than the preset one, and an automatic and manual operation change-over switch 31 mounted in said solenoid operated valve control circuit 32 so as to change the automatic operation over to the manual one and vice versa.

Accordingly, only by manipulating the gear shifting lever, the brake and the decelerator can be rendered operative automatically without depressing the brake pedal and the decelerator pedal, and also the vehicle can be switched smoothly from the forward drive over to the backward drive and vice versa without imparting any shock to the vehicle body. When the detected actual vehicle speed is higher than the preset one, the brake and the decelerator will be rendered operative automatically, and then the transmission gear will be changed over to its relevant position, whilst when the detected vehicle speed is lower than the preset one, the brake and the decelerator will be rendered inoperative and the transmission gear will be changed over immediately. Further, the automatic operation can be changed smoothly over to the manual one and vice versa.

It is to be understood that the foregoing description is merely illustrative of the preferred embodiment of the present invention, and that the scope of the invention is not to be limited thereto, but is to be determined by the scope of the appended claims.

What is claimed is:

1. An automatic decelerator device for use in track-type vehicles such as a bulldozer or the like, characterized by the combination of:
    (a) a vehicle speed change lever means having a plurality of speed stages for forward and backward drives, said speed change lever means including a gear shift lever, wherein a change of the vehicle speed and/or the drive direction is effected by said gear shifting lever;

(b) a plurality of solenoid operated valves provided in a transmission gear and selectively used for changing over the vehicle speed and/or the drive direction;

(c) a first controller with a servo-motor adapted to actuate the braking action of a brake means;

(d) a second controller with a servo-motor adapted to actuate a decelerator;

(e) a comparator adapted to compare an actual vehicle speed, which is detected by means of a revolution sensor provided near an output shaft of the transmission gear, with a preset vehicle speed previously supplied into the comparator so as to detect whether the actual vehicle speed thus detected is higher or lower than the preset one, and then generate a signal corresponding to the result of the detection; and (f) a solenoid operated valve control circuit coupled to said vehicle speed change lever means and said comparator and arranged to control said first and second controllers and said solenoid operated valves in response to the state of said speed change lever means and the actual vehicle speed.

2. The device as claimed in claim 1, wherein said first controller is electrically connected to steering levers, a brake pedal, said brake means and said solenoid operated valve control circuit.

3. The device as claimed in claim 1, wherein said second controller is electrically connected to a decelerator pedal, a throttle lever for an engine and said solenoid operated valve control circuit.

4. The device as claimed in claim 1, wherein said comparator is arranged such that when the detected actual vehicle speed is higher than the preset one, said brake means and said decelerator are automatically actuated so as to slow down the vehicle speed, and thereafter said controller and said solenoid operated valves are controlled to perform a change-over of the vehicle speed, while when the detected actual vehicle speed is lower than the preset one, said brake means and said decelerator are not actuated, thereby immediately controlling said controller and said solenoid operated valves so as to carry out the change-over of the vehicle speed.

5. The device as claimed in claim 1, further including an automatic and manual operation change-over switch provided in said solenoid operated valve control circuit to change the automatic operation of said device to manual and vice versa.

* * * * *